(12) United States Patent
Miyachi et al.

(10) Patent No.: US 7,828,040 B2
(45) Date of Patent: Nov. 9, 2010

(54) SUN SHADE APPARATUS

(75) Inventors: Yutaka Miyachi, Kariya (JP); Koichi Takeuchi, Kariya (JP); Shinji Tominaga, Kariya (JP); Yoshitaka Jokaku, Kariya (JP)

(73) Assignee: Toyota Boshoku Kabushiki Kaisha, Aichi (JP)

( * ) Notice: Subject to any disclaimer, the term of this patent is extended or adjusted under 35 U.S.C. 154(b) by 552 days.

(21) Appl. No.: 11/882,944

(22) Filed: Aug. 7, 2007

(65) Prior Publication Data

US 2008/0035285 A1    Feb. 14, 2008

(30) Foreign Application Priority Data

Aug. 10, 2006   (JP) .............................. 2006-218100

(51) Int. Cl.
B60J 3/00   (2006.01)
(52) U.S. Cl. .................... 160/370.22; 160/122
(58) Field of Classification Search ............ 160/370.22, 160/265, 270, 271, 273.1, 274, 122, DIG. 2, 160/903; 296/97.4, 97.7, 97.8, 97.9, 142, 296/143
See application file for complete search history.

(56) References Cited

U.S. PATENT DOCUMENTS

| 6,910,518 | B2 | 6/2005 | Zimmermann et al. | |
|---|---|---|---|---|
| 7,503,374 | B2 * | 3/2009 | Takeuchi et al. | 160/370.22 |
| 2004/0069425 | A1 * | 4/2004 | Hansen et al. | 160/370.22 |
| 2005/0045287 | A1 * | 3/2005 | Hansen et al. | 160/370.22 |
| 2005/0051285 | A1 * | 3/2005 | Yano et al. | 160/370.22 |
| 2005/0126724 | A1 * | 6/2005 | Ayran | 160/370.21 |
| 2006/0260771 | A1 | 11/2006 | Takeuchi et al. | |

FOREIGN PATENT DOCUMENTS

| DE | 198 26 537 | 12/1999 |
|---|---|---|
| JP | 5-55975 | 7/1993 |
| JP | 2003-182358 | 7/2003 |
| JP | 2005-145444 | 6/2005 |
| JP | 2006-036190 | 2/2006 |
| JP | 2006-327273 | 12/2006 |

* cited by examiner

*Primary Examiner*—David Purol
(74) *Attorney, Agent, or Firm*—Wenderoth, Lind & Ponack, L.L.P.

(57) ABSTRACT

A sun shade apparatus of the present invention having a cable provided so as to be capable of being forced out or drawn in, a connector connecting the cable and a curtain to each other, a guide rail provided on a window portion, and a slide member attached to the curtain and slidable on the guide rail. The curtain is stretched with the operation for forcing out or drawing in the cable. The guide rail has a bracket for fixing the guide rail on a vehicle door panel. One end of the bracket is engaged with a flange portion of the door panel, while the other end is fixed on the door panel by a fixing member.

14 Claims, 7 Drawing Sheets

SUN SHADE APPARATUS

CROSS REFERENCE TO RELATED APPLICATION

This application claims priority from Japanese Patent Application No. 2006-218100 filed Aug. 10, 2006. The entire content of this priority application is incorporated herein by reference.

BACKGROUND

I. Technical Field

The present invention relates to a sun shade apparatus mounted on a vehicle door or the like.

II. Description of the Related Art

Japanese Patent Laid-Open No. 2005-145444 discloses a main window portion generally having an upwardly/downwardly slidable window and a sub window portion substantially in triangular shape are provided on a rear seat side door of a vehicle, and a sun shade apparatus for protection against the sun being provided on each window portion.

The sun shade apparatus on the sub window portion has a roll-up device provided on a window frame portion provided at the boundary between the sub and main window portions. A shade (curtain) is drawn out from the roll-up device. More specifically, the shade is drawn out in the vehicle front-rear direction by a slide member connected to an end of the shade, and the end of the shade is held at a rear end of the sub window portion to shield the sub window portion.

The sun shade apparatus on the sub window portion requires a guide rail for enabling the slide member to slide along the window frame. However, since the window frame portion is a flange portion of a body panel, a stud bolt, a welded nut or the like cannot be provided thereon in ordinary cases. Thus, a fixing portion extending from the guide rail is used to support the guide rail. If the guide rail is supported at a position remote from the guide rail as above, there is a possibility of a reduction in product quality because the guide rail rattles and produces rattling noise or the like from vibration during traveling of the vehicle for example, and because such rattling affects the riding comfort of the vehicle.

SUMMARY

An object of the present invention is to provide a sun shade apparatus capable of suitably holding a guide rail on a body panel and controlling rattling of the guide rail and having improved reliability.

A sun shade apparatus of the present invention includes a cable provided so as to be capable of being forced out or drawn in, a curtain capable of shielding a window portion by being stretched between a shielding state and an open state on the window portion with an operation for forcing out or drawing in the cable, a connector connecting the cable and the curtain to each other, a guide rail provided on the window portion, a slide member attached to the curtain and slidable on the guide rail, and a bracket provided on the guide rail to fix the guide rail on a vehicle door panel, one end of the bracket being engaged with a flange portion of the door panel, the other end of the bracket being fixed on the door panel by a fixing member.

In the thus-arranged sun shade apparatus, the guide rail is stably fixed on the door panel by the bracket. One end of the bracket is engaged with the flange portion of the door panel, while the other end is fixed on the door panel, so that fixation is achieved with a high fixing force. Moreover, the fixed position is not remote from the guide rail. Therefore, rattling of the guide rail due to vibration during traveling of the vehicle or the like and the generation of rattling noise or the like can be prevented so that the riding comfort of the vehicle will not be affected, resulting in improving the product quality.

In particular, it is difficult to form a stud bolt, a welded nut or the like for fastening on the flange portion of the door panel of the vehicle on which the guide rail is fixed. In the conventional art, fastening is performed at a position remote from the guide rail. According to the present invention, the guide rail is fastened to the flange portion of the door panel by using the bracket and, therefore, the occurrence of rattling of the guide rail can be prevented with reliability. That is, according to the present invention, the bracket is used to enable fastening the guide rail and the door panel at the position at which fastening has not been achieved due to a body forming condition. A hook structure using the flange portion is adopted to enable fixation of the bracket on the door panel by using an existing design without changing the shape of the door panel when achieving the fastening, and to enable setting of the fastening at any position on the flange portion of the door panel. Therefore, the fixed position balance of the guide rail can also be improved.

In the sun shade apparatus of the present invention, the distance between a peak of the flange portion and the guide rail may be set larger at the rear side than at the front side of the window portion, and the bracket may be provided at the vehicle rear side of the guide rail.

In a case where the flange portion and the guide rail are gradually spaced apart from each other along the direction toward the rear of the window portion as above, a support further improved in stability can be obtained by placing the bracket at the rear side.

In the sun shade apparatus of the present invention, a clip may be provided as the fixing member.

In such a case, fixing between the guide rail and the door panel can be achieved by using, for example, a simple arrangement in which the clip is attached to the bracket and is fitted in a hole formed in the door panel. Therefore the assembly process can be made extremely simple to improve the facility with operations relating to the fixing.

In the sun shade apparatus of the present invention, an attachment seat for fixing a trim covering the vehicle door panel may be formed on the guide rail.

If the trim is fixed on the guide rail by such an attachment seat formed on the guide rail, the trim can also be fixed without rattling by means of the guide rail firmly fixed by the bracket.

DETAILED DESCRIPTION OF THE INVENTION

A sun shade apparatus of the present invention will be described with respect to an illustrative aspect thereof with reference to the drawings.

Figure 1:
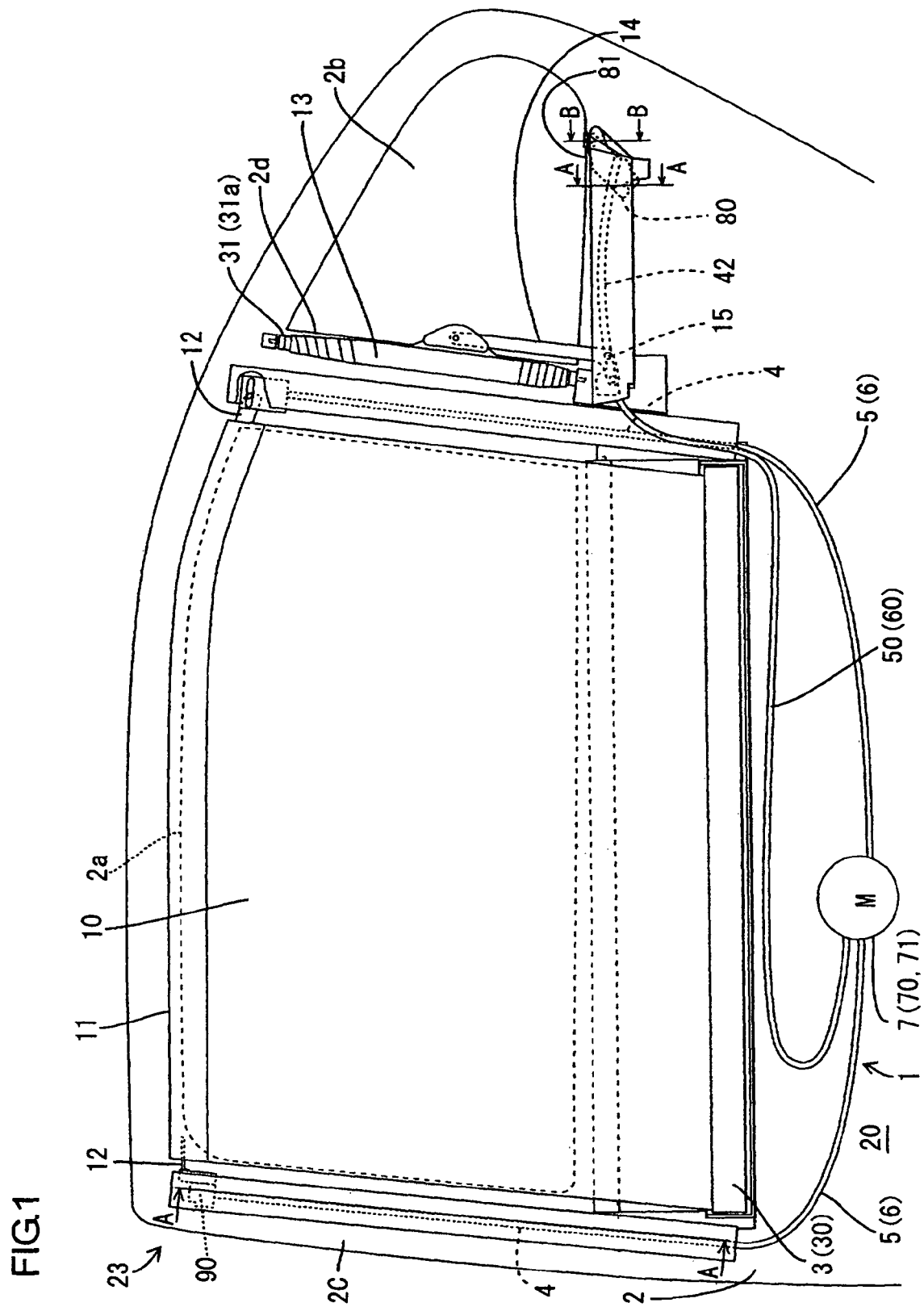
FIG. 1 is a front view of a door of a vehicle from the vehicle interior side.

FIG. 1 is a front view of a vehicle door having a sun shade apparatus in accordance with the present invention seen from the vehicle interior side. As shown in FIG. 1, a vehicle door 23 of the present illustrative aspect has a door panel 2 having side windows 2a and 2b, and a sun shade apparatus (also called a blind apparatus) 1 is provided on the inside of the door panel 2. The door panel 2 has the side windows 2a and 2b in its upper region, the area of which is about half the entire area, and also has a pillar 2c and a pillar (division frame) 2d.

The pillar 2c stands at the vehicle-front-side edge of the door and constitutes a vehicle-front-side window member for the first side window 2a. The pillar 2d stands between the side windows 2a and 2b and partitions these side windows from each other. The pillar 2d constitutes a vehicle-rear-side window member for the first side window 2a and also constitutes a vehicle-front-side window member for the second side window 2b. The pillars 2c and 2d extend substantially parallel to each other to form the first side window 2a on the vehicle front side in substantially rectangular form.

On the other hand, the second side window 2b on the vehicle rear side is formed in substantially a triangular form by being partitioned by the pillar 2d. A window glass is mounted in the first side window 2a so as to be upwardly/downwardly movable, while a window glass is immovably mounted in the second side window 2b. A trim 20 is mounted in a lower region of the door panel 2. The trim 20 covers substantially the entire region on the vehicle interior side of the door panel 2 below the side windows 2a and 2b.

The sun shade apparatus 1 has a first blind sheet (curtain) 10 for covering the first side window 2a and a second blind sheet (curtain) 13 for covering the second side window 2b, as shown in FIG. 1. The sun shade apparatus 1 also has a case 3 provided with a roll-up shaft 30 for rolling up the first blind sheet 10, a case 31 having a roll-up shaft 31a for rolling up the second blind sheet 13, and stretching means (6, 7) for stretching the first blind sheet 10 and the second blind sheet 13 between a shielding state and an open state.

The blind sheets 10 and 13 are sheets for shielding light coming into the vehicle compartment (light shielding or attenuating sheets), e.g., mesh sheets or translucent sheets). The blind sheets 10 and 13 are stretched along the vehicle-interior-side surfaces of the window glasses mounted in the side windows 2a and 2b to cover the side windows 2a and 2b.

A frame 11 is attached to an upper end edge of the first blind sheet 10. The frame 11 stretches the upper end edge of the first blind sheet 10 in the vehicle front-rear direction. Sliders (sliding members) 12 extending in the frontward and rearward directions are provided on the front and rear ends of the frame 11.

The sun shade apparatus 1 has a pair of rails (guide rails) 4 for guiding and supporting the sliders 12. Each rail 4 extends along the pillar 2c or the pillar 2d to guide and support the slider 12 in the upward/downward direction. The rails 4 are provided at the same position in the height direction as the first side window 2a.

The stretching means for stretching the first blind sheet 10 is a means for lifting the sliders 12 along the rails 4. The stretching means has two cables 6, two cable guides (outer tubes) 5 and one pay-out device 7.

Each cable guide 5 is tubular and a cable 6 is inserted through the cable guide 5. The cable 6 is a compression-resistant member having, for example, a core wire (not shown) formed of a flexible metal wire or a plastic wire or the like, and a coil (not shown) wound around the outer periphery of the core wire with a constant pitch. One end of the cable 6 is attached by means of a connector 90 to the slider 12 provided on the frame 11 for the first blind sheet 10. The cable 6 is inserted through the rail 4 and subsequently through the cable guide 5. Accordingly, the cable 6 is guided and supported by and moved along the rail 4 and the cable guide 5 to move the slider 12 along the rail 4.

The pay-out device 7 is provided on an intermediate portion of the cable guide 5.

The pay-out device 7 has a gear box 70 having a gear, and a motor 71. The gear is of such a construction (not shown) as to mesh with the coil of the cable 6, and is rotated by the drive force of the motor 71. The cable 6 is paid out by the rotation of the gear. The cable 6 is thereby moved to lift the slider 12 while being guided by the cable guide 5 and the rail 4.

The two cable guides 5 are connected to the pay-out device 7. The two cables 6 inserted through the two cable guides 5 respectively are simultaneously paid out by the one pay-out device 7. Consequently, the two cables 6 lift a pair of sliders 12 in synchronization with each other.

A frame 14 is attached to a stretching end edge of the second blind seat 13. A slider 15 (corresponding to the connector and the slide member) projecting downward and having an arm 15a swingably supporting the frame 14 is provided on the frame 14.

The sun shade apparatus 1 also has a rail (guide rail) 42 for guiding and supporting the slider 15. The rail 42 is provided below the second side window 2b and extends in the vehicle front-rear direction along the lower end of the second side window 2b. The rail 42 is disposed between the door panel 2 and the trim 20 and is fixed on the door panel 2 by a bracket 80.

The stretching means for stretching the blind sheet 13 is a means for pushing the slider 15 toward the rear of the vehicle along the rail 42. The stretching means for stretching the blind sheet 13 includes a cable 60, a cable guide 50 and the pay-out device 7 for paying out the cable 60. The pay-out device 7 has a gear box 70 and a motor 71. The cable 60 is connected to the slider 15 and is inserted through the rail 42 and the cable guide 50.

On the other hand, the roll-up shaft 30 is provided in the case 3 and is axially supported by the case 3. A lower end edge of the first blind sheet 10 is attached to the roll-up shaft 30. The roll-up shaft 30 is rotated about its axis to roll up the first blind sheet 10. A coil spring (not shown) is provided between the roll-up shaft 30 and the case 3 to urge the roll-up shaft 30. More specifically, the coil spring urges the roll-up shaft 30 in the direction of rolling up the first blind sheet 10. Accordingly, the roll-up shaft 30 rolls up the first blind sheet 10 by the urging force of the coil spring.

The roll-up shaft 31a is axially supported in the other case 31. The roll-up shaft 31a rolls up the second blind sheet 13 by using the urging force of a coil spring (not shown) provided between the roll-up shaft 31a and the case 31.

An attachment seat 42a having a through hole for fixing an upper rear portion of the trim 20 is formed at a position with an offset from a rail portion in the vehicle compartment interior side surface of the guide rail 42.

Next, an essential portion of the sun shade apparatus 1 will be described in detail.

Figure 2:
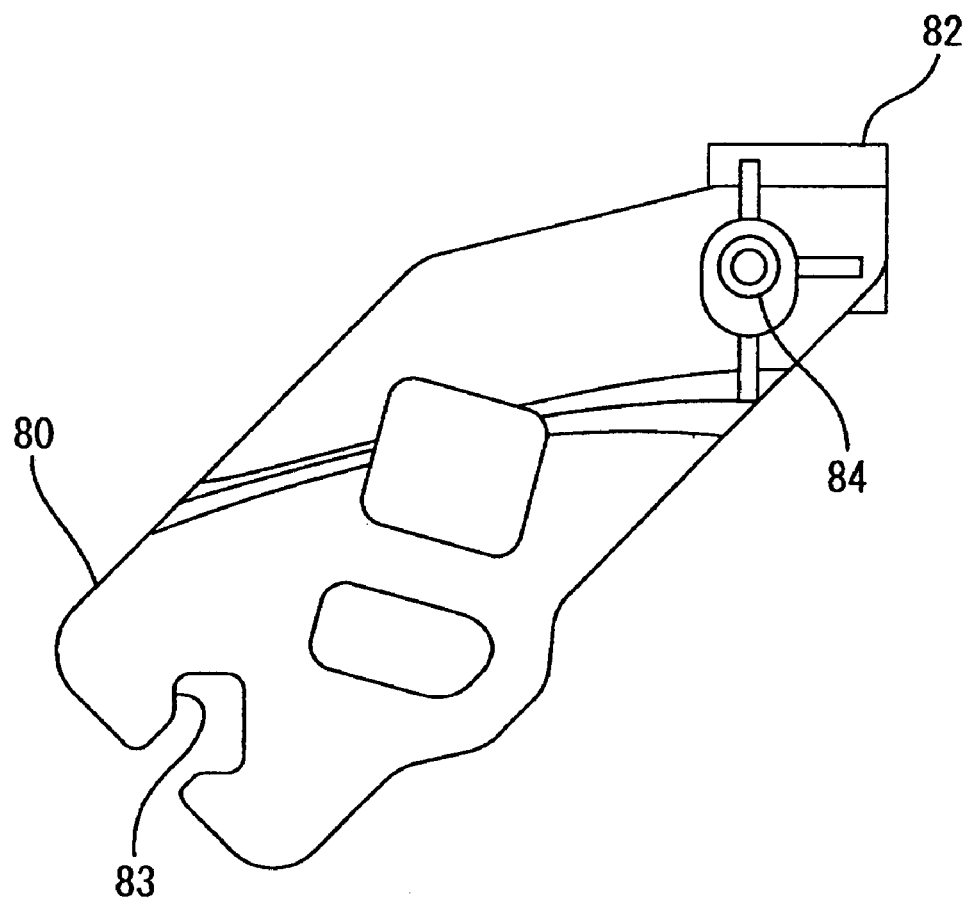
FIG. 2 is a front view of the bracket.
Figure 3:
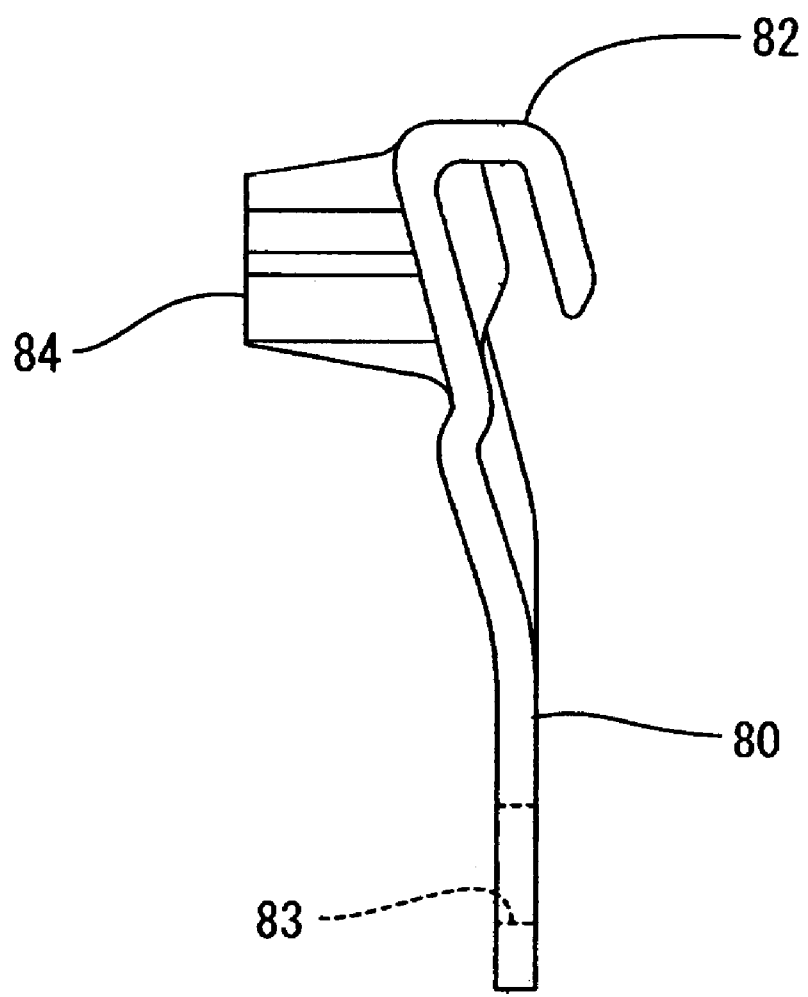
FIG. 3 is a side view of the bracket.
Figure 4:
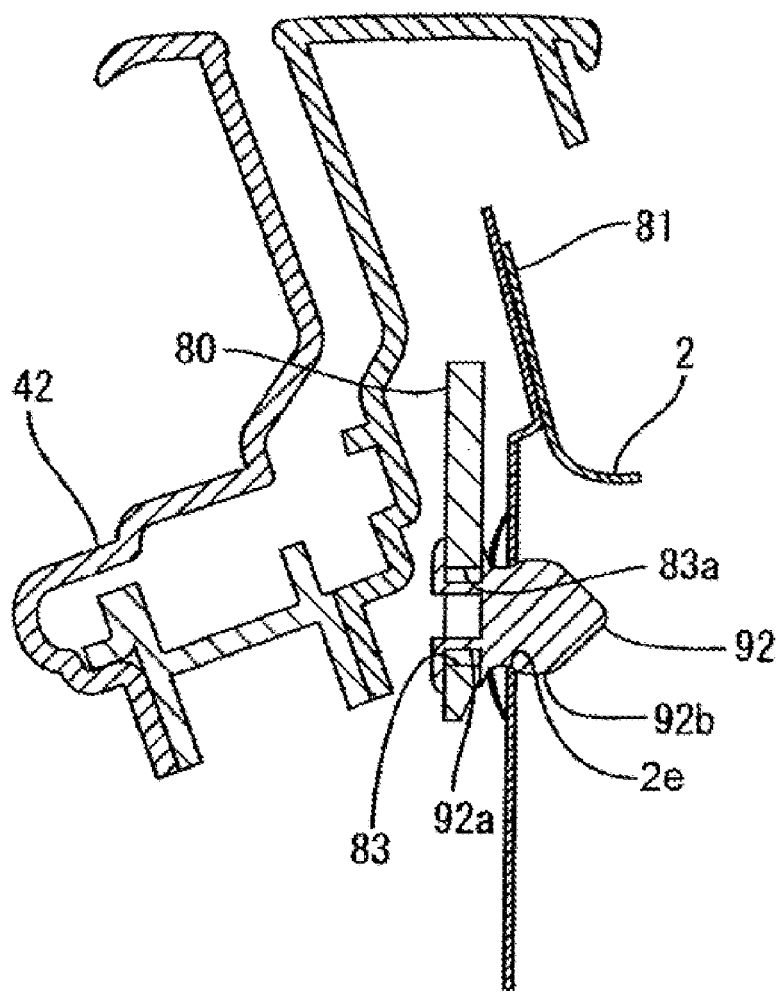
FIG. 4 is a sectional view taken along line A-A in FIG. 1.
Figure 5:
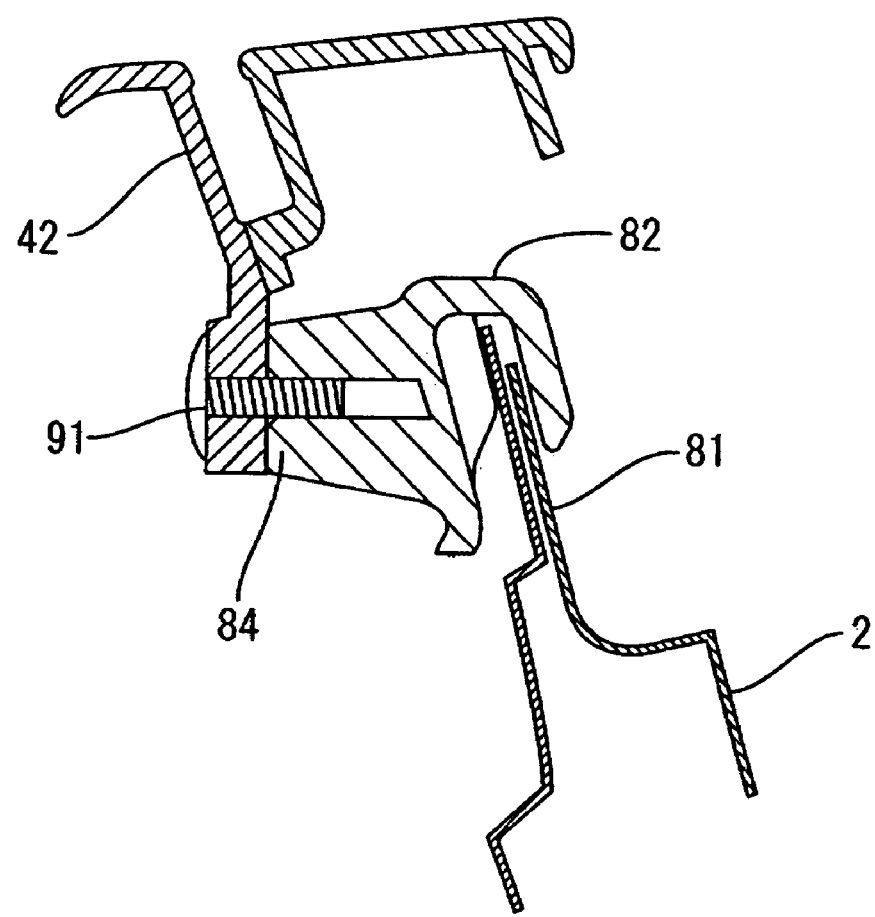
FIG. 5 is a sectional view taken along line B-B in FIG. 1.

FIGS. 2 to 5 are diagrams showing the construction of the bracket 80. As described above, the bracket 80 is a fixing means for fixing the rail 42 on the door panel 2. FIG. 2 is a front view of the bracket 80. FIG. 3 is a side view of the bracket 80. FIG. 4 is a sectional view taken along line A-A in FIG. 1. FIG. 5 is a sectional view taken along line B-B in FIG. 1.

Figure 6:
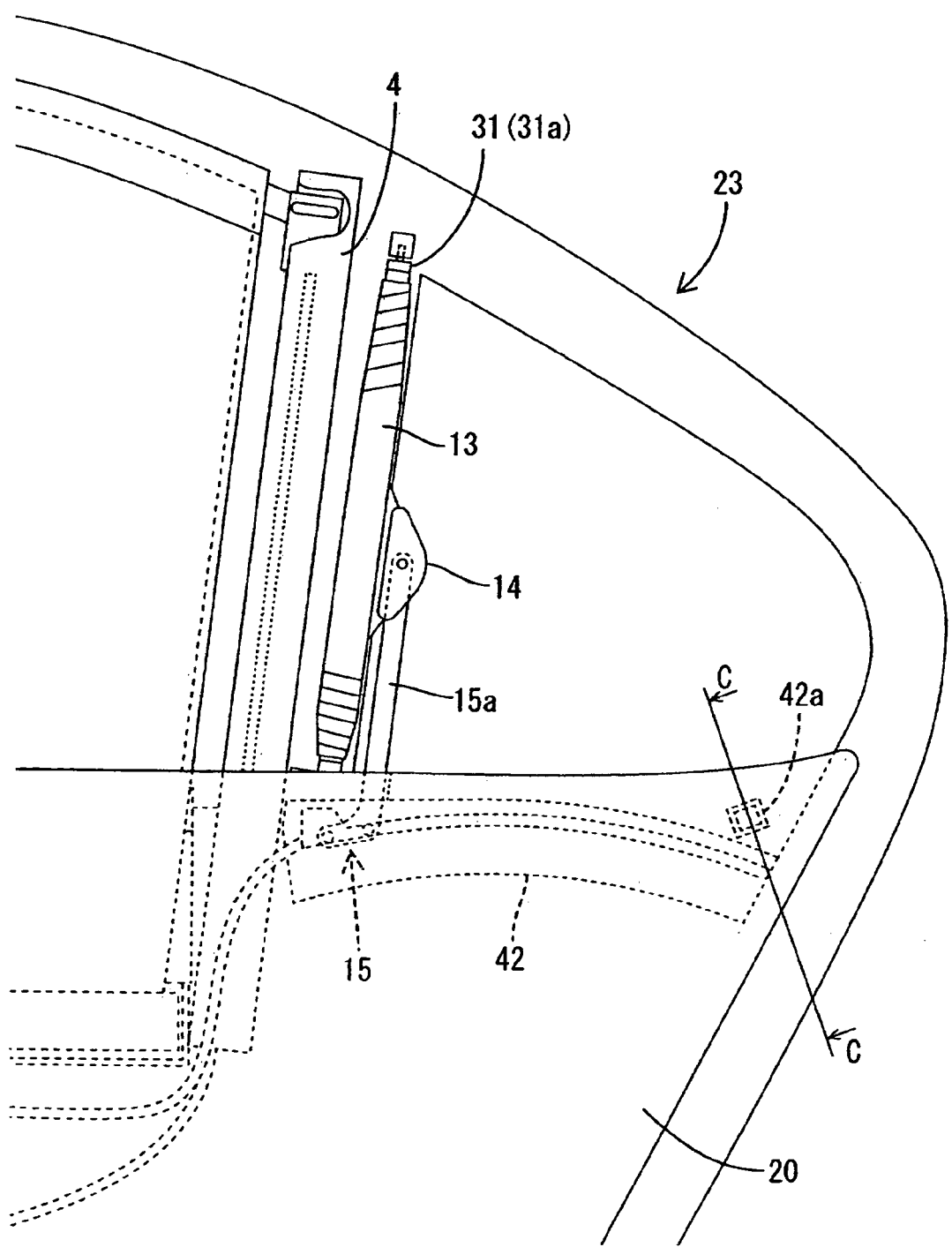
FIG. 6 is a side view showing the position at which an attachment seat is provided.
Figure 7:
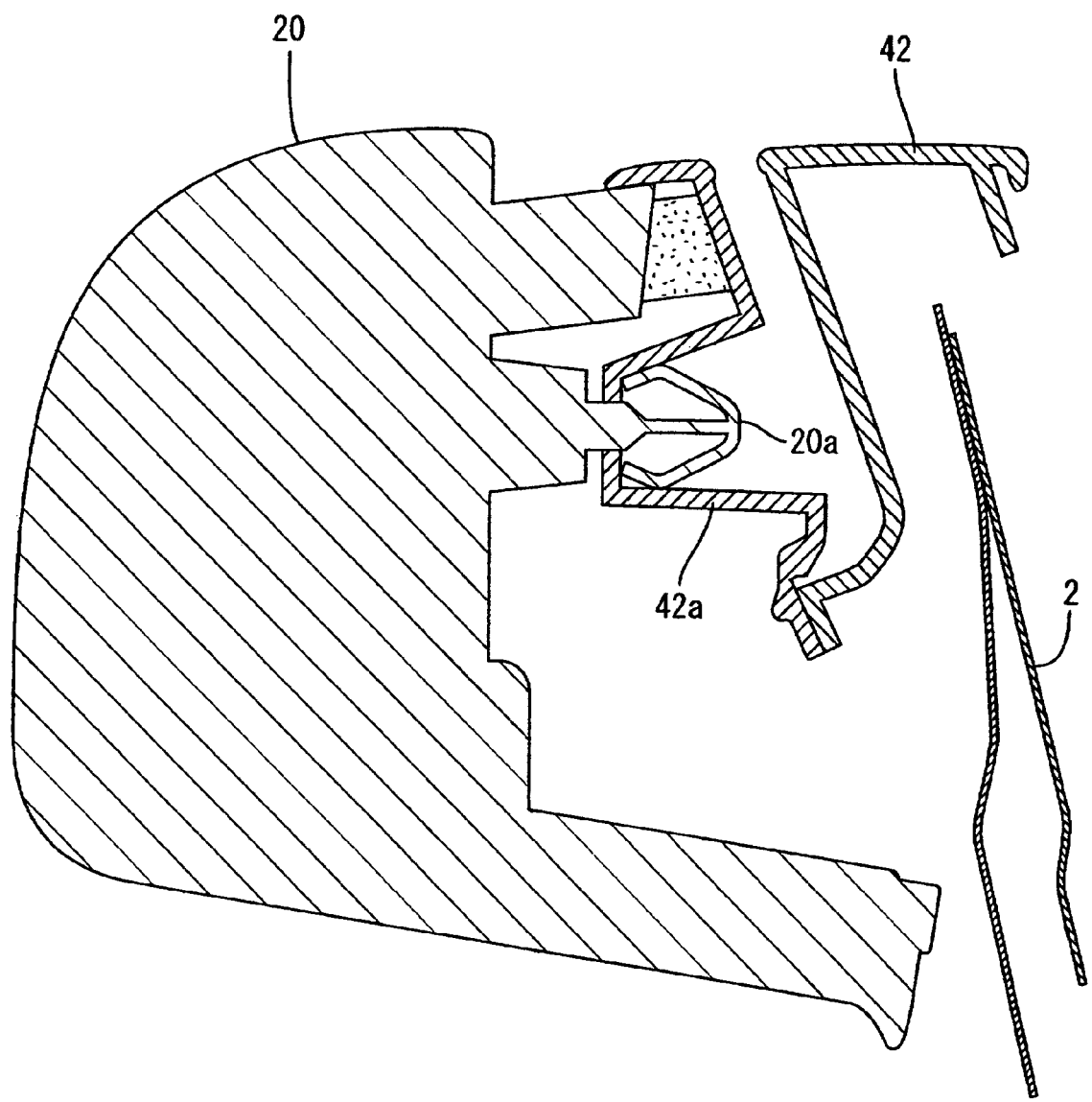
FIG. 7 is a sectional view taken along line C-C in FIG. 6.

FIGS. 6 and 7 are diagrams showing the construction of the attachment seat 42a. FIG. 6 is a side view showing the position at which the attachment sear 42 is provided. FIG. 7 is a sectional view taken along line C-C in FIG. 6.

In the sun shade apparatus 1 in the present illustrative aspect, the rail 42 for guiding the slider 15 on the side window (window portion) 2b side is fixed by the bracket 80 on the door panel 2 constituting the lower window frame of the side window 2b. The bracket 80 has, as shown in FIGS. 2 and 3, a hook portion 82 for hooking the bracket 80 on a flange 81 of the door panel 2 (see FIGS. 1 and 5) and a fixing member insertion hole 83 for fixing the bracket 80 on the door panel 2 by means of a clip 92 provided as a fixing member (see FIG. 4). The hook portion 82 is formed by bending the bracket 80 at one end (upper end) of the same. The fixing member insertion hole 83 is formed by cutting out the bracket 80 at the other end.

The bracket 80 is mounted on the door panel 2 as described below. The hook portion 82 is hooked on the flange 81 of the door panel 2 from above, as shown in FIG. 5, and the clip (fixing member) 92 is inserted into the door panel 2 through the fixing member insertion hole 83 to engage the bracket 80 and the door panel 2 with each other by means of the clip 92, as shown in FIG. 4. An opening end 83a of the fixing member insertion hole 83 is engaged with a recess 92a formed on an outer periphery of the clip 92 at one end of the same, and a projection 92b formed at the other end is engaged with an opening 2e of the door panel 2, as shown in FIG. 4.

On the other hand, the bracket 80 is mounted on the rail 42 by fastening with a screw 91 the rail 42 to a boss 84 formed on the bracket 80, as shown in FIG. 5.

In the present illustrative aspect, the bracket 80 is provided at the rear of the rail 42 to achieve fixation on the door panel 2.

In the sun shade apparatus 1 in the present illustrative aspect having the rail 42 fixed on the door panel 2 by using the bracket 80, the rail 42 is stably fixed on the door panel 2. More specifically, the upper end of the bracket 80 is engaged with the flange 81 of the door panel 2, while the lower end is fixed on the door panel 2 by means of the clip 92. This fixation is achieved with a high fixing force at a position not remote from the rail 42. Therefore, "rattling" of the rail 42 due to vibration during traveling of the vehicle or the like does not occur easily. The generation of "rattling noise" or the like due to such vibration is thus prevented.

It is difficult to form a stud bolt, a welded nut or the like on the flange 81 of the door panel 2 on which the rail 42 is fixed. In the conventional art, fastening is performed at a position remote from the rail 42. According to the present illustrative aspect, however, the rail 42 is fastened to the flange 81 of the door panel 2 by using the bracket 80. Therefore, the occurrence of rattling of the rail 42 can be prevented with reliability.

That is, according to the present illustrative aspect, the bracket 80 is used to enable fastening between the rail 42 and the door panel 2 at the position at which fastening has not been achieved due to a door panel 2 forming condition. A hook structure using the flange 81 is adopted to enable fixation of the bracket 80 on the door panel 2 by using an existing design without changing the shape of the door panel 2 when achieving the fastening, and to enable setting of the fastening at any position on the flange 81 of the door panel 2. Therefore, the fixed position balance of the rail 42 can also be improved.

In the present illustrative aspect, the flange 81 and the rail 42 are gradually spaced apart from each other along the direction toward the rear of the window portion 2b, and the bracket 80 is provided at the vehicle rear side of the rail 42. In a case where the flange 81 and the rail 42 are gradually spaced apart from each other along the direction toward the rear of the window portion 2b as above, a support improved in stability can be obtained by placing the bracket 80 at the rear side.

As shown in FIG. 6, the attachment seat 42a to which the trim 20 covering the vehicle door panel 2 is fixed is formed on the guide rail 42. More specifically, the attachment seat 42a is provided at a position with an offset from the rail portion in the vehicle compartment interior side surface of the guide rail 42, and has a through hole for fixing an upper rear portion of the trim 20.

On the attachment seat 42a thus formed on the guide rail 42, an engaging member 20a for the trim 20 is inserted in and engaged with the through hole of the attachment seat 42a to fix the trim 20, as shown in FIG. 7. Consequently, the trim 20 can also be fixed without rattling by means of the guide rail 42 firmly fixed by the bracket 80.

An illustrative aspect of the present invention has been described. However, the present invention is not limited to the described illustrative aspect. Other illustrative aspects described below are also conceivable.

(1) In the above-described illustrative aspect, the rail 42 provided on the window portion 2b is fixed on the door panel 2 by the bracket 80. The arrangement of the present invention can be adopted, for example, in a case where a rail provided on the window portion 2a is fixed on the flange portion of the door panel 2.

(2) In the above-described illustrative aspect, the bracket 80 and the door panel 2 are fixed by the clip 92, and the bracket 80 and the rail 4 are fixed by the screw 91. However, the means for this fixing is not limited to the clip or the screw. This fixing may be performed by some other fastening means.

What is claimed is:

1. A sun shade apparatus comprising:

a cable provided so as to be capable of being forced out or drawn in;

a curtain configured to shield a window portion of a vehicle door by being stretched between a shielding state and an open state on the window portion with an operation of forcing out or drawing in said cable;

a connector connecting said cable and said curtain to each other;

a guide rail configured to be disposed on the window portion;

a slide member attached to said curtain and slidable on said guide rail; and a bracket disposed on said guide rail, and being configured to fix said guide rail on a panel of the vehicle door, said bracket including a first end and a second end, said first end having a hook portion, wherein said first end is configured to engage with a flange portion of the door panel by said hook portion being hooked on the flange portion, and said second end is configured to be fixed on the door panel by a fixing member.

2. A sun shade apparatus according to claim 1, wherein:

the distance between the flange portion and the guide rail is larger at a rear side of the window portion than at a front side of the window portion; and said bracket is disposed at a vehicle rear side of the guide rail.

3. A sun shade apparatus according to claim 1, wherein said fixing member is a clip.

4. A sun shade apparatus according to claim 2, wherein said fixing member is a clip.

5. A sun shade apparatus according to claim 1, wherein an attachment seat for fixing a trim covering the panel of the vehicle door is formed on said guide rail.

6. A sun shade apparatus according to claim 2, wherein an attachment seat for fixing a trim covering the panel of the vehicle door is formed on said guide rail.

7. A sun shade apparatus according to claim 3, wherein an attachment seat for fixing a trim covering the panel of the vehicle door is formed on said guide rail.

8. A sun shade apparatus according to claim 4, wherein an attachment seat for fixing a trim covering the panel of the vehicle door is formed on said guide rail.

9. A sun shade apparatus comprising:
a cable provided so as to be capable of being forced out or drawn in;
a curtain configured to shield a window portion of a vehicle door by being stretched between a shielding state and an open state on the window portion with an operation of forcing out or drawing in said cable;
a connector connecting said cable and said curtain to each other;
a guide rail configured to be disposed on the window portion;
a slide member attached to said curtain and slidable on said guide rail; and
a bracket disposed on said guide rail to fix said guide rail on a panel of the vehicle door, and which is positioned at a rear side of said guide rail, a first end of said bracket being engaged with a flange portion of the panel of the vehicle door, the distance between the flange portion and said guide rail being larger at a rear side of the window portion than at a front side of the window portion, and a second end of said bracket being fixed on the panel of the vehicle door by a fixing member.

10. A sun shade apparatus according to claim 9, wherein said fixing member is a clip.

11. A sun shade apparatus according to claim 9, wherein an attachment seat for fixing a trim covering the panel of the vehicle door is formed on said guide rail.

12. A sun shade apparatus according to claim 10, wherein an attachment seat for fixing a trim covering the panel of the vehicle door is formed on said guide rail.

13. A sun shade apparatus comprising:
a cable provided so as to be capable of being forced out or drawn in;
a curtain configured to shield a window portion by being stretched between a shielding state and an open state on the window portion of a vehicle door with the operation of forcing out or drawing in said cable;
a connector connecting said cable and said curtain to each other;
a guide rail configured to be disposed on the window portion;
a slide member attached to said curtain and slidable on said guide rail; and
a bracket disposed on said guide rail to fix said guide rail on a panel of the vehicle door, and being positioned at a rear side of said guide rail, a first end of said bracket being engaged with a flange portion of the panel of the vehicle door, the distance between the flange portion and said guide rail being larger at a rear side of the window portion than at a front side of the window portion, and a second end of said bracket being fixed on the panel of the vehicle door by a fixing member which is formed of a clip.

14. A sun shade apparatus according to claim 13, wherein an attachment seat for fixing a trim covering the panel of the vehicle door is formed on said guide rail.

* * * * *